(12) United States Patent
Tarquini (10) Patent No.: US 7,197,762 B2
(45) Date of Patent: Mar. 27, 2007

(54) METHOD, COMPUTER READABLE MEDIUM, AND NODE FOR A THREE-LAYERED INTRUSION PREVENTION SYSTEM FOR DETECTING NETWORK EXPLOITS

(75) Inventor: Richard Paul Tarquini, Apex, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1198 days.

(21) Appl. No.: 10/003,747

(22) Filed: Oct. 31, 2001

(65) Prior Publication Data

US 2003/0084329 A1    May 1, 2003

(51) Int. Cl.
*H04L 29/08* (2006.01)
*H04L 29/02* (2006.01)
*H04L 29/06* (2006.01)

(52) U.S. Cl. .............................. 726/3; 726/23; 726/13

(58) Field of Classification Search ................ 713/151, 713/152, 153; 726/3, 23, 13
See application file for complete search history.

(56) References Cited

U.S. PATENT DOCUMENTS 6,279,113 B1 *   8/2001   Vaidya ........................ 713/201
6,851,061 B1 *   2/2005   Holland et al. ............. 713/201

FOREIGN PATENT DOCUMENTS

GB           2342020 A    3/2000

* cited by examiner

Primary Examiner—Gilberto Barrón, Jr.
Assistant Examiner—Venkat Perungavoor
(74) Attorney, Agent, or Firm—Fulbright & Jaworski LLP (57) ABSTRACT

A method of preventing intrusions on a node of a network comprising monitoring, by a first layer of an intrusion prevention system, application data of applications running at on the node, monitoring, by a second layer of the intrusion prevention system, transport layer data of the node, and monitoring, by a third layer of the intrusion prevention system, network layer data of the node is provided. A computer-readable medium having stored thereon a set of instructions to be executed, the set of instructions, when executed by a processor, cause the processor to perform a computer method of monitoring application layer data, by a first layer of an intrusion prevention system comprised of the instructions, of a node of a network, the node comprising the processor, monitoring transport layer data, by a second layer of the intrusion prevention system, of the node of the network; and monitoring network layer data, by a third layer of an intrusion prevention system, of the node of the network is provided. A node of a network, comprising a central processing unit, a memory module for storing data in machine readable format for retrieval and execution by the central processing unit, and an operating system comprising a network stack comprising a protocol driver, a media access control driver, the memory module storing an instance of an intrusion protection system application operable to monitor application layer data and an intrusion prevention system transport service provider layer, and the operating system having an intrusion prevention system network filter service provider bound to the media access control driver and the protocol driver is provided.

3 Claims, 5 Drawing Sheets

METHOD, COMPUTER READABLE MEDIUM, AND NODE FOR A THREE-LAYERED INTRUSION PREVENTION SYSTEM FOR DETECTING NETWORK EXPLOITS

CROSS-REFERENCE TO RELATED APPLICATIONS

This patent application is related to co-pending U.S. patent application Ser. No. 10/003,501, entitled "METHOD AND COMPUTER READABLE MEDIUM FOR SUPPRESSING EXECUTION OF SIGNATURE FILE DIRECTIVES DURING A NETWORK EXPLOIT," filed Oct. 31, 2001, co-assigned herewith; U.S. patent application Ser. No. 10/001,431, entitled "SYSTEM AND METHOD OF DEFINING THE SECURITY CONDITION OF A COMPUTER SYSTEM," filed Oct. 31, 2001, co-assigned herewith; U.S. patent application Ser. No. 10/001,410, entitled "SYSTEM AND METHOD OF DEFINING THE SECURITY VULNERABILITIES OF A COMPUTER SYSTEM," filed Oct. 31, 2001, co-assigned herewith; U.S. patent application Ser. No. 10/002,695, entitled "SYSTEM AND METHOD OF DEFINING UNAUTHORIZED INTRUSIONS ON A COMPUTER SYSTEM," filed Oct. 31, 2001, co-assigned herewith; U.S. patent application Ser. No. 10/002,423, entitled "NETWORK INTRUSION DETECTION SYSTEM AND METHOD," filed Oct. 31, 2001, co-assigned herewith; U.S. patent application Ser. No. 10/001,445, entitled "NODE, METHOD AND COMPUTER READABLE MEDIUM FOR INSERTING AN INTRUSION PREVENTION SYSTEM INTO A NETWORK STACK," filed Oct. 31, 2001, co-assigned herewith; U.S. patent application Ser. No. 10/003,815, entitled "METHOD, COMPUTER-READABLE MEDIUM, AND NODE FOR DETECTING EXPLOITS BASED ON AN INBOUND SIGNATURE OF THE EXPLOIT AND AN OUTBOUND SIGNATURE IN RESPONSE THERETO," filed Oct. 31, 2001, co-assigned herewith; U.S. patent application Ser. No. 10/001,446, entitled "NETWORK, METHOD AND COMPUTER READABLE MEDIUM FOR DISTRIBUTED SECURITY UPDATES TO SELECT NODES ON A NETWORK," filed Oct. 31, 2001, co-assigned herewith; U.S. patent application Ser. No. 10/002,0712, entitled "SYSTEM AND METHOD OF AN OS-INTEGRATED INTEGRATED INTRUSION DETECTION AND ANTI-VIRUS SYSTEM," filed Oct. 31, 2001,co-assigned herewith; U.S. patent application Ser. No. 10/002,697 entitled "METHOD, NODE AND COMPUTER READABLE MEDIUM FOR IDENTIFYING DATA IN A NETWORK EXPLOIT," filed Oct. 31, 2001,co-assigned herewith; U.S. patent application Ser. No. 10/003,820, entitled "NODE, METHOD AND COMPUTER READABLE MEDIUM FOR OPTIMIZING PERFORMANCE OF SIGNATURE RULE MATCHING IN A NETWORK," filed Oct. 31, 2001, co-assigned herewith; U.S. patent application Ser. No. 10/003,819 entitled "METHOD, NODE AND COMPUTER READABLE MEDIUM FOR PERFORMING MULTIPLE SIGNATURE MATCHING IN AN INTRUSION PREVENTION SYSTEM," filed Oct. 31, 2001, co-assigned herewith; U.S. patent application Ser. No. 10/002,694, entitled "USER INTERFACE FOR PRESENTING DATA FOR AN INTRUSION PROTECTION SYSTEM," filed Oct. 31, 2001, co-assigned herewith; U.S. patent application Serial No. 10/001,728, entitled "NODE AND MOBILE DEVICE FOR A MOBILE TELECOMMUNICATIONS NETWORK PROVIDING INTRUSION DETECTION," filed Oct. 31, 2001, co-assigned herewith U.S. patent application Ser. No. 10/003,510, entitled "METHOD AND COMPUTER-READABLE MEDIUM FOR INTEGRATED A DECODE ENGINE WITH AN INTRUSION DETECTION SYSTEM," filed Oct. 31, 2001, co-assigned herewith; U.S. patent application Ser. No. 10/002,064, entitled "SYSTEM AND METHOD OF GRAPHICALLY DISPLAYING DATA FOR AN INTRUSION PROTECTION SYSTEM," filed Oct. 31, 2001, co-assigned herewith; and U.S. patent application Serial No. 10/001,350, entitled "SYSTEM AND METHOD OF GRAPHICALLY CORRELATING DATA FOR AN INTRUSION PROTECTION SYSTEM," filed Oct. 31, 2001, co-assigned herewith.

TECHNICAL FIELD OF THE INVENTION

This invention relates to network technologies, and more particularly, to a method and computer readable medium for providing a three-layered intrusion prevention system.

BACKGROUND OF THE INVENTION

Network-exploit attack tools, such as denial-of-service (DoS) attack utilities, are becoming increasing sophisticated and, due to evolving technologies, simple to execute. Relatively unsophisticated attackers can arrange, or be involved in, computer system compromises directed at one or more targeted facilities. A network system attack (also referred to herein as an intrusion) is an unauthorized or malicious use of a computer or computer network and may involve hundred or thousands of unprotected, or alternatively compromised, Internet nodes together in a coordinated attack on one or more selected targets.

Network attack tools based on the client/server model have become a preferred mechanism for executing network attacks on targeted networks or devices. High capacity machines in networks having deficient security are often desired by attackers to launch distributed attacks therefrom. University servers typically feature high connectivity and capacity but relatively mediocre security. Such networks also often have inexperienced or overworked network administrators making them even more vulnerable for involvement in network attacks.

Network-exploit attack tools, comprising hostile attack applications such as denial-of-service (DoS) utilities, responsible for transmitting data across a network medium will often have a distinctive "signature," or recognizable pattern within the transmitted data. The signature may comprise a recognizable sequence of particular packets and/or recognizable data that is contained within one or more packets. Signature analysis is often performed by a network intrusion prevention system (IPS) and may be implemented as a pattern-matching algorithm and may comprise other signature recognition capabilities as well as higher-level application monitoring utilities. A simple signature analysis algorithm may search for a particular string that has been identified as associated with a hostile application. Once the string is identified within a network data stream, the one or more packets carrying the string may be identified as "hostile," or exploitative, and the IPS may then perform any one or more of a number of actions, such as logging the identification of the frame, performing a countermeasure, or performing another data archiving or protection measure.

Intrusion prevention systems (IPS) encompass technology that attempts to identify exploits against a computer system or network of computer systems. Numerous types of IPSs exist and each are generally classified as either a network-based, host-based, or node-based IPS.

Network-based IPS appliances are typically dedicated systems placed at strategic places on a network to examine data packets to determine if they coincide with known attack signatures. To compare packets with known attack signatures, network-based IPS appliances utilize a mechanism referred to as passive protocol analysis to inconspicuously monitor, or "sniff," all traffic on a network and to detect low-level events that may be discerned from raw network traffic. Network exploits may be detected by identifying patterns or other observable characteristics of network frames. Network-based IPS appliances examine the contents of data packets by parsing network frames and packets and analyzing individual packets based on the protocols used on the network. A network-based IPS appliance inconspicuously monitors network traffic inconspicuously, i.e., other network nodes may be, and often are, unaware of the presence of the network-based IPS appliance. Passive monitoring is normally performed by a network-based IPS appliance by implementation of a "promiscuous mode" access of a network interface device. A network interface device operating in promiscuous mode copies packets directly from the network media, such as a coaxial cable, 100baseT or other transmission medium, regardless of the destination node to which the packet is addressed. Accordingly, there is no simple method for transmitting data across the network transmission medium without the network-based IPS appliance examining it and thus the network-based IPS appliance may capture and analyze all network traffic to which it is exposed. Upon identification of a suspicious packet, i.e., a packet that has attributes corresponding to a known attack signature monitored for occurrence by the network-based IPS appliance, an alert may be generated thereby and transmitted to a management module of the IPS so that a networking expert may implement security measures. Network-based IPS appliances have the additional advantage of operating in real-time and thus can detect an attack as it is occurring. Moreover, a network-based IPS appliance is ideal for implementation of a state-based IPS security measure that requires accumulation and storage of identified suspicious packets of attacks that may not be identified "atomically," that is by a single network packet. For example, transmission control protocol (TCP) synchronization (SYN) flood attacks are not identifiable by a single TCP SYN packet but rather are generally identified by accumulating a count of TCP SYN packets that exceed a predefined threshold over a defined period of time. A network-based IPS appliance is therefore an ideal platform for implementing state-based signature detection because the network-based IPS appliance may collect all such TCP SYN packets that pass over the local network media and thus may properly archive and analyze the frequency of such events.

However, network-based IPS appliances may often generate a large number of "false positives," i.e., incorrect diagnoses of an attack. False positive diagnoses by network-based IPS appliances result, in part, due to errors generated during passive analysis of all the network traffic captured by the IPS that may be encrypted and formatted in any number of network supported protocols. Content scanning by a network-based IPS is not possible on an encrypted link although signature analysis based on protocol headers may be performed regardless of whether the link is encrypted or not. Additionally, network-based IPS appliances are often ineffective in high speed networks. As high speed networks become more commonplace, software-based network-based IPS appliances that attempt to sniff all packets on a link will become less reliable. Most critically, network-based IPS appliances can not prevent attacks unless integrated with, and operated in conjunction with, a firewall protection system.

Host-based IPSs detect intrusions by monitoring application layer data. Host-based IPSs employ intelligent agents to continuously review computer audit logs for suspicious activity and compare each change in the logs to a library of attack signatures or user profiles. Host-based IPSs may also poll key system files and executable files for unexpected changes. Host-based IPSs are referred to as such because the IPS utilities reside on the system to which they are assigned to protect. Host-based IPSs typically employ application-level monitoring techniques that examine application logs maintained by various applications. For example, a host-based IPS may monitor a database engine that logs failed access attempts and/or modifications to system configurations. Alerts may be provided to a management node upon identification of events read from the database log that have been identified as suspicious. Host-based IPSs, in general, generate very few false-positives. However, host-based IPS such as log-watchers are generally limited to identifying intrusions that have already taken place and are also limited to events occurring on the single host. Because log-watchers rely on monitoring of application logs, any damage resulting from the logged attack will generally have taken place by the time the attack has been identified by the IPS. Some host-based IPSs may perform intrusion-preventative functions such as 'hooking' or 'intercepting' operating system application programming interfaces to facilitate execution of preventative operations by an IPS based on application layer activity that appears to be intrusion-related. Because an intrusion detected in this manner has already bypassed any lower level IPS, a host-based IPS represents a last layer of defense against network exploits. However, host-based IPSs are of little use for detecting low-level network events such as protocol events.

Node-based IPSs apply the intrusion detection and/or prevention technology on the system being protected. An example of node-based IPS technologies is inline intrusion detection. A node-based IPS may be implemented at each node of the network that is desired to be protected. Inline IPSs comprise intrusion detection technologies embedded in the protocol stack of the protected network node. Because the inline IPS is embedded within the protocol stack, both inbound and outbound data will pass through, and be subject to monitoring by, the inline IPS. An inline IPS overcomes many of the inherent weaknesses of network-based solutions. As mentioned hereinabove, network-based solutions are generally ineffective when monitoring high-speed networks due to the fact that network-based solutions attempt to monitor all network traffic on a given link. Inline intrusion prevention systems, however, only monitor traffic directed to the node on which the inline IPS is installed. Thus, attack packets can not physically bypass an inline IPS on a targeted machine because the packet must pass through the protocol stack of the targeted device. Any bypassing of an inline IPS by an attack packet must be done entirely by 'logically' bypassing the IPS, i.e., an attack packet that evades an inline IPS must do so in a manner that causes the inline IPS to fail to identify, or improperly identify, the attack packet. Additionally, inline IPSs provide the hosting node with low-level monitoring and detection capabilities similar to that of a network IPS and may provide protocol analysis and signature matching or other low-level monitoring or filtering of host traffic. The most significant advantage offered by inline IPS technologies is that attacks are detected as they occur. Whereas host-based IPSs determine attacks by monitoring system logs, inline intrusion detection involves monitoring network traffic and isolating those packets that are determined to be part of an attack against the hosting server and thus enabling the inline IPS to actually prevent the attack from succeeding. When a packet is determine to be part of an attack, the inline IPS layer may discard the packet thus preventing the packet from reaching the upper layer of the protocol stack where damage may be caused by the attack packet—an effect that essentially creates a local firewall for the server hosting the inline IPS and protecting it from threats coming either from an external network, such as the Internet, or from within the network. Furthermore, the inline IPS layer may be embedded within the protocol stack at a layer where packets have been unencrypted so that the inline IPS is effective operating on a network with encrypted links. Additionally, inline IPSs can monitor outgoing traffic because both inbound and outbound traffic respectively destined to and originating from a server hosting the inline IPS must pass through the protocol stack.

Although the advantages of inline IPS technologies are numerous, there are drawbacks to implementing such a system. Inline intrusion detection is generally processor intensive and may adversely effect the node's performance hosting the detection utility. Additionally, inline IPSs may generate numerous false positive attack diagnoses. Furthermore, inline IPSs cannot detect systematic probing of a network, such as performed by reconnaissance attack utilities, because only traffic at the local server hosting the inline IPS is monitored thereby.

Each of network-based, host-based and inline-based IPS technologies have respective advantages as described above. Ideally, an intrusion prevention system will incorporate all of the aforementioned intrusion detection strategies. Additionally, an IPS may comprise one or more event generation mechanisms that report identifiable events to one or more management facilities. An event may comprise an identifiable series of system or network conditions or it may comprise a single identified condition. An IPS may also comprise an analysis mechanism or module and may analyze events generated by the one or more event generation mechanisms. A storage module may be comprised within an IPS for storing data associated with intrusion-related events. A countermeasure mechanism may also be comprised within the IPS for executing an action intended to thwart, or negate, a detected exploit.

Typical computer network attacks involve three general stages of attack: reconnaissance attacks, the actual network attack, and erasing electronic footprints of the attack. A reconnaissance attack is launched prior to execution of the actual network attack. A reconnaissance attack is performed to collect information on the network that is later used to facilitate the actual network attack. In general, a reconnaissance attack attempts to determine information regarding DNS and web servers, firewall access control lists (ACLs), IPS information, internal network configuration, trust relationships, operating systems, applications running on specific nodes as well as other general network information that may assist the attacker in exploiting network security weaknesses in an attack thereon. For example, a common network tool that is often used by an attacker during reconnaissance attacks is NMAP. NMAP is a networking tool used to obtain information about hosts on a network by issuing a series of queries, or probes, to the host's protocol stack. NMAP is often able to determine what operating system a host is running and what network ports are open, as well as other information, by the particular response returned by the probed host. Known security holes may then be exploited by the attacker upon procurement of this information.

Numerous network attacks exist and are well-documented and new attacks are continually being developed by attackers. Network attacks typically exploit known security holes and result in reduction or total loss of network system performance, damage to network and/or node software and/or hardware components. Skilled attackers may then complete an attack by erasing electronic footprints of the attack thereby preventing forensic analysis and diagnostics by network administrators or network security personnel.

As mentioned hereinabove, each type of IPS has weaknesses associated therewith. For example, network-based and host-based IPSs cannot prevent attacks whereas node-based systems are unable to implement state-based security measures. Furthermore, prior-art IPSs are ineffective in preventing a protected node from participating in an attack.

SUMMARY OF THE INVENTION

In accordance with an embodiment of the present invention, a method of preventing intrusions on a node of a network comprising monitoring, by a first layer of an intrusion prevention system, application data of applications running at on the node, monitoring, by a second layer of the intrusion prevention system, transport layer data of the node, and monitoring, by a third layer of the intrusion prevention system, network layer data of the node is provided.

In accordance with another embodiment of the present invention, a computer-readable medium having stored thereon a set of instructions to be executed, the set of instructions, when executed by a processor, cause the processor to perform a computer method of monitoring application layer data, by a first layer of an intrusion prevention system comprised of the instructions, of a node of a network, the node comprising the processor, monitoring transport layer data, by a second layer of the intrusion prevention system, of the node of the network; and monitoring network layer data, by a third layer of an intrusion prevention system, of the node of the network is provided.

In accordance with another embodiment of the present invention, a node of a network, comprising a central processing unit, a memory module for storing data in machine readable format for retrieval and execution by the central processing unit, and an operating system comprising a network stack comprising a protocol driver, a media access control driver, the memory module storing an instance of an intrusion protection system application operable to monitor application layer data and an intrusion prevention system transport service provider layer, and the operating system having an intrusion prevention system network filter service provider bound to the media access control driver and the protocol driver is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
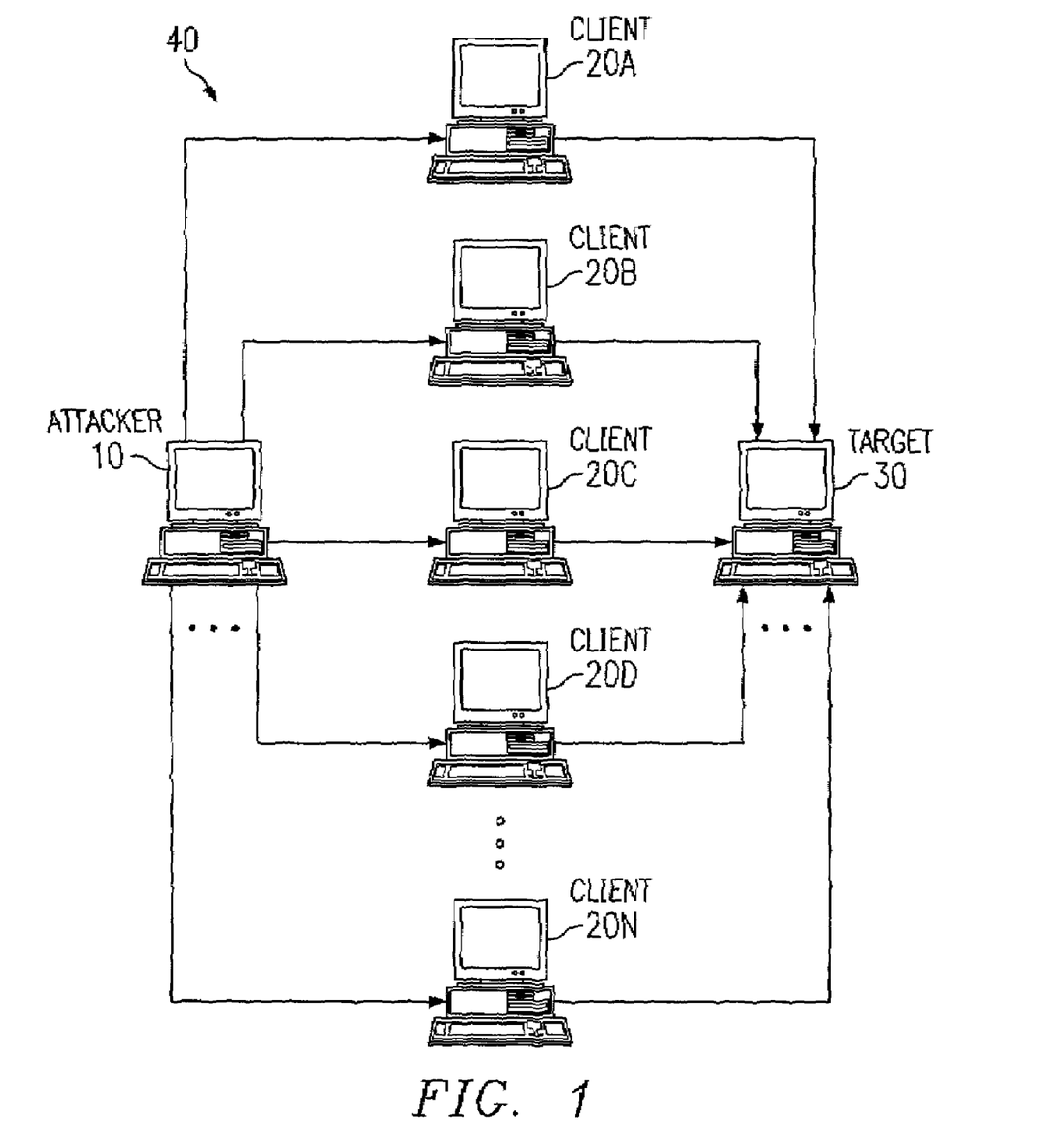
FIG. 1 illustrates an exemplary arrangement for executing a computer system compromise according to the prior art.

In FIG. 1, there is illustrated an exemplary arrangement for executing a computer system compromise—the illustrated example showing a simplified distributed intrusion network 40 arrangement typical of distributed system attacks directed at a target machine 30. An attack machine 10 may direct execution of a distributed attack by any number of attack agents 20A–20N by one of numerous techniques such as remote control by IRC "robot" applications. Attack agents 20A–20N, also referred to as "zombies" and "attack agents," are generally computers that are available for public use or that have been compromised such that a distributed attack may be launched upon command of an attack machine 10. Numerous types of distributed attacks may be launched against a target machine 30. The target machine may suffer extensive damage from simultaneous attack by attack agents 20A–20N and the attack agents 20A–20N may be damaged from the client attack application as well. A distributed intrusion network may comprise an additional layer of machines involved in an attack intermediate the attack machine 10 and attack agents 20A–20N. These intermediate machines are commonly referred to as "handlers" and each handler may control one or more attack agents 20A–20N. The arrangement shown for executing a computer system compromise is illustrative only and may compromise numerous arrangements that are as simple as a single attack machine 10 attacking a target machine 30 by, for example, sending malicious probe packets or other data intended to compromise target machine 30. Target machine may be, and often is, connected to a larger network and access thereto by attack machine 10 may cause damage to a large collection of computer systems commonly located within the network.

Figure 2:
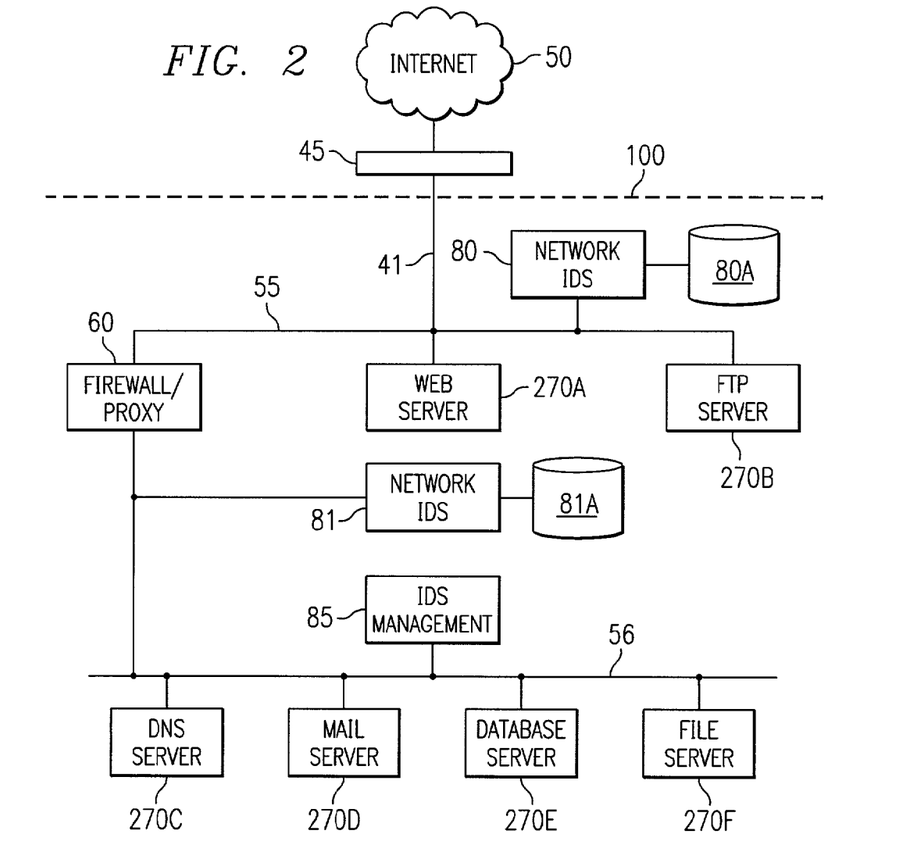
FIG. 2 illustrates a comprehensive intrusion prevention system employing network-based and hybrid host-based and node based intrusion detection technologies according to an embodiment of the invention.

In FIG. 2, there is illustrated a comprehensive intrusion prevention system employing network-based and hybrid host-based/node-based intrusion detection technologies according to an embodiment of the invention. One or more networks 100 may interface with the Internet 50 via a router 45 or other device. In the illustrative example, two Ethernet networks 55 and 56 are comprised in network 100. Ethernet network 55 comprises a web-content server 270A and a file transport protocol-content server 270B. Ethernet network 56 comprises a domain name server 270C, a mail server 270D, a database sever 270E and a file server 270F. A firewall/proxy router 60 disposed intermediate Ethernets 55 and 56 provides security and address resolution to the various systems of network 56. A network-based IPS appliance 80 and 81 is respectively implemented on both sides of firewall/proxy router 60 to facilitate monitoring of attempted attacks against one or more elements of Ethernets 55 and 56 and to facilitate recording successful attacks that successfully penetrate firewall/proxy router 60. Network-based IPS appliances 80 and 81 may respectively comprise (or alternatively be connected to) a database 80A and 81A of known attack signatures, or rules, against which network frames captured thereby may be compared. Alternatively, a single database (not shown) may be centrally located within network 100 and may be accessed by network-based IPS appliances 80 and 81. Accordingly, network-based IPS appliance 80 may monitor all packets inbound from Internet 50 to network 100 arriving at Ethernet network 55. Similarly, a network-based IPS appliance 81 may monitor and compare all packets passed by firewall/proxy router 60 for delivery to Ethernet network 56. An IPS management node 85 may also be part of network 100 to facilitate configuration and management of the IPS components in network 100.

In view of the above-noted deficiencies of network-based intrusion prevention systems, a hybrid host-based and node-based intrusion prevention system is preferably implemented within each of the various nodes, such as servers 270A–270N (also referred to herein as "nodes"), of Ethernet networks 55 and 56 in the secured network 100. Management node 85 may receive alerts from respective nodes within network 100 upon detection of an intrusion event by any one of the network-based IPS appliances 80 and 81 as well as any of the nodes of network 100 having a hybrid agent-based and node-based IPS implemented thereon. Additionally, each node 270A–270F may respectively employ a local file system for archiving intrusion-related events, generating intrusion-related reports, and storing signature files against which local network frames and/or packets are examined.

Preferably, network-based IPS appliances 80 and 81 are dedicated entities for monitoring network traffic on associated Ethernets 55 and 56 of network 100. To facilitate intrusion detection in high speed networks, network-based IPS appliances 80 and 81 preferably comprise a large capture RAM for capturing packets as they arrive on respective Ethernet networks 55 and 56. Additionally, it is preferable that network-based IPS appliances 80 and 81 respectively comprise hardware-based filters for filtering network traffic, although IPS filtering by network-based IPS appliances 80 and 81 may be implemented in software. Moreover, network-based IPS appliances 80 and 81 may be configured, for example by demand of IPS management node 85, to monitor one or more specific devices rather than all devices on a common network. For example, network-based IPS appliance 80 may be directed to monitor only network data traffic addressed to web server 270A.

Hybrid host-based/node-based intrusion prevention system technologies may be implemented on all nodes 270A–270N on Ethernet networks 55 and 56 that may be targeted by a network attack. In general, each node is comprised of a reprogrammable computer having a central processing unit (CPU), a memory module operable to store machine-readable code that is retrievable and executable by the CPU, and may further comprise various peripheral devices, such as a display monitor, a keyboard, a mouse or another device, connected thereto. A storage media, such as a magnetic disc, an optical disc or another component operable to store data, may be connected to memory module and accessible thereby and may provide one or more databases for archiving local intrusion events and intrusion event reports. An operating system may be loaded into memory module, for example upon bootup of the respective node, and comprises an instance of a protocol stack as well as various low-level software modules required for tasks such as interfacing to peripheral hardware, scheduling of tasks, allocation of storage as well as other system tasks. Each node protected by the hybrid host-based and node-based IPS of the present invention accordingly has an IPS software application maintained within the node, such as in a magnetic hard disc, that is retrievable by the operating system and executable by the central processing unit. Additionally, each node executing an instance of the IPS application has a local database from which signature descriptions of documented attacks may be fetched from storage and compared with a packet or frame of data to detect a correspondence therebetween. Detection of a correspondence between a packet or frame at an IDS server may result in execution of any one or more of various security procedures.

The IPS described with reference to FIG. 2 may be implemented on any number of platforms. Each hybrid host-based/node-based instance of the IPS application described herein is preferably implemented on a network node, such as web server 270A operated under control of an operating system, such as Windows NT 4.0 that is stored in a main memory and running on a central processing unit, and attempts to detect attacks targeted at the hosting node. The particular network 100 illustrated in FIG. 2 is exemplary only and may comprise any number of network servers. Corporate, and other large scale, networks may typically comprise numerous individual systems providing similar services. For example, a corporate network may comprise hundreds of individual web servers, mail servers, FTP servers and other systems providing common data services.

Figure 3:
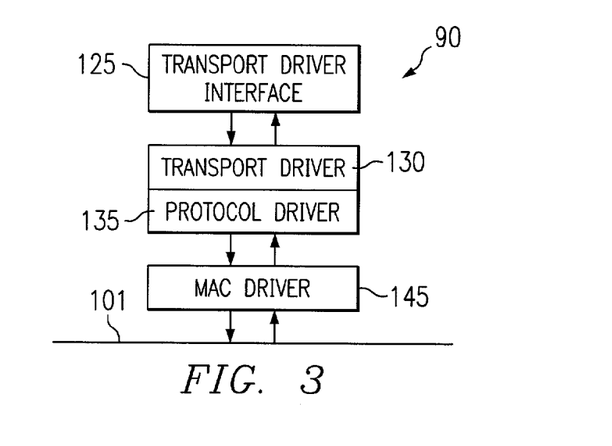
FIG. 3 is an exemplary network protocol stack according to the prior art.

Each operating system of a node incorporating an instance of an IPS application additionally comprises a network protocol stack 90, as illustrated in FIG. 3, that defines the entry point for frames received by a targeted node from the network, e.g. the Internet or Intranet. Network stack 90 as illustrated is representative of the well-known WindowsNT (TM) system network protocol stack and is so chosen to facilitate discussion and understanding of the invention. However, it should be understood that the invention is not limited to a specific implementation of the illustrated network stack 90 but, rather, stack 90 is described to facilitate understanding of the invention. Network stack 90 comprises a transport driver interface (TDI) 125, a transport driver 130, a protocol driver 135 and a media access control (MAC) driver 145 that interfaces with the physical media 101. Transport driver interface 125 functions to interface the transport driver 130 with higher-level file system drivers. Accordingly, TDI 125 enables operating system drivers, such as network redirectors, to activate a session, or bind, with the appropriate protocol driver 135. Accordingly, a redirector can access the appropriate protocol, for example UDP, TCP, NetBEUI or other network or transport layer protocol, thereby making the redirector protocol-independent. The protocol driver 135 creates data packets that are sent from the computer hosting the network protocol stack 90 to another computer or device on the network or another network via the physical media 101. Typical protocols supported by an NT network protocol stack comprise NetBEUI, TCP/IP, NWLink, Data Link Control (DLC) and AppleTalk although other transport and/or network protocols may be comprised. MAC driver 145, for example an Ethernet driver, a token ring driver or other networking driver, provides appropriate formatting and interfacing with the physical media 101 such as a coaxial cable or another transmission medium.

The capabilities of the host-based IPS comprise application monitoring of: file system events; registry access; successful security events; failed security events and suspicious process monitoring. Network access applications, such as Microsoft IIS and SQL Server, may also have processes related thereto monitored.

Intrusions may be prevented on a particular IPS host by implementation of inline, node-based monitoring technologies. The inline-IPS is preferably comprised as part of a hybrid host-based/node-based IPS although it may be implemented independently of any host-based IPS system. The inline-IPS will analyze packets received at the hosting node and perform signature analysis thereof against a database of known signatures by network layer filtering.

Figure 4:
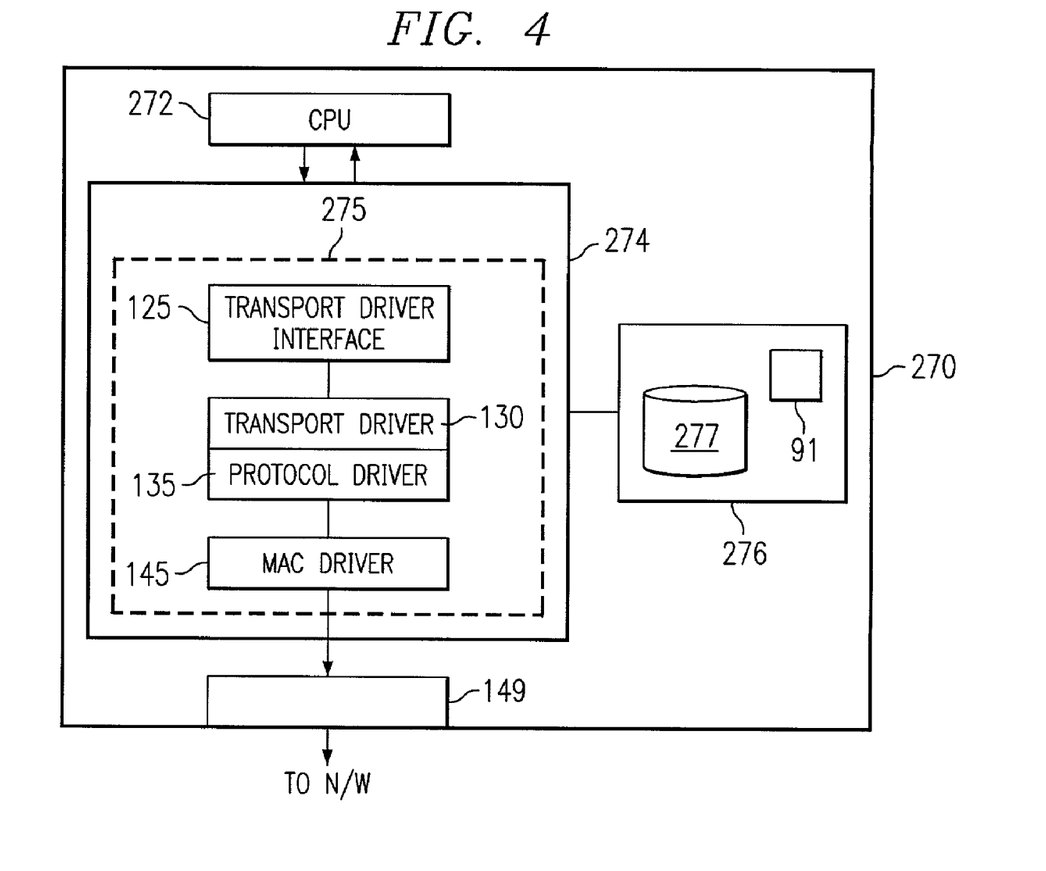
FIG. 4 illustrates a network node that may run an instance of an intrusion protection system application according to an embodiment of the present invention.

In FIG. 4, there is illustrated a network node 270 that may run an instance of an IPS application 91 and thus operate as an IPS server. IPS application 91 is implemented as a three-layered IPS according to an embodiment of the present invention and may comprise a server application and/or a client application. Network node 270, in general, comprises a central processing unit (CPU) 272 and a memory module 274 operable to store machine-readable code that is retrievable and executable by CPU 272 via a bus (not shown). A storage media 276, such as a magnetic disc, an optical disc or another component operable to store data, may be connected to memory module 274 and accessible thereby by the bus as well. An operating system 275 may be loaded into memory module 274, for example upon bootup of node 270, and comprises an instance of protocol stack 90 and may have an intrusion prevention system application 91 loaded from storage media 276. One or more network exploit rules, an exemplary form described in co-pending application entitled "Method, Node and Computer Readable Medium for Identifying Data in a Network Exploit", may be compiled into a machine-readable signature(s) and stored within a database 277 that is loadable into memory module 274 and may be retrieved by IPS application 91 for facilitating analysis of network frames and/or packets.

Figure 5:
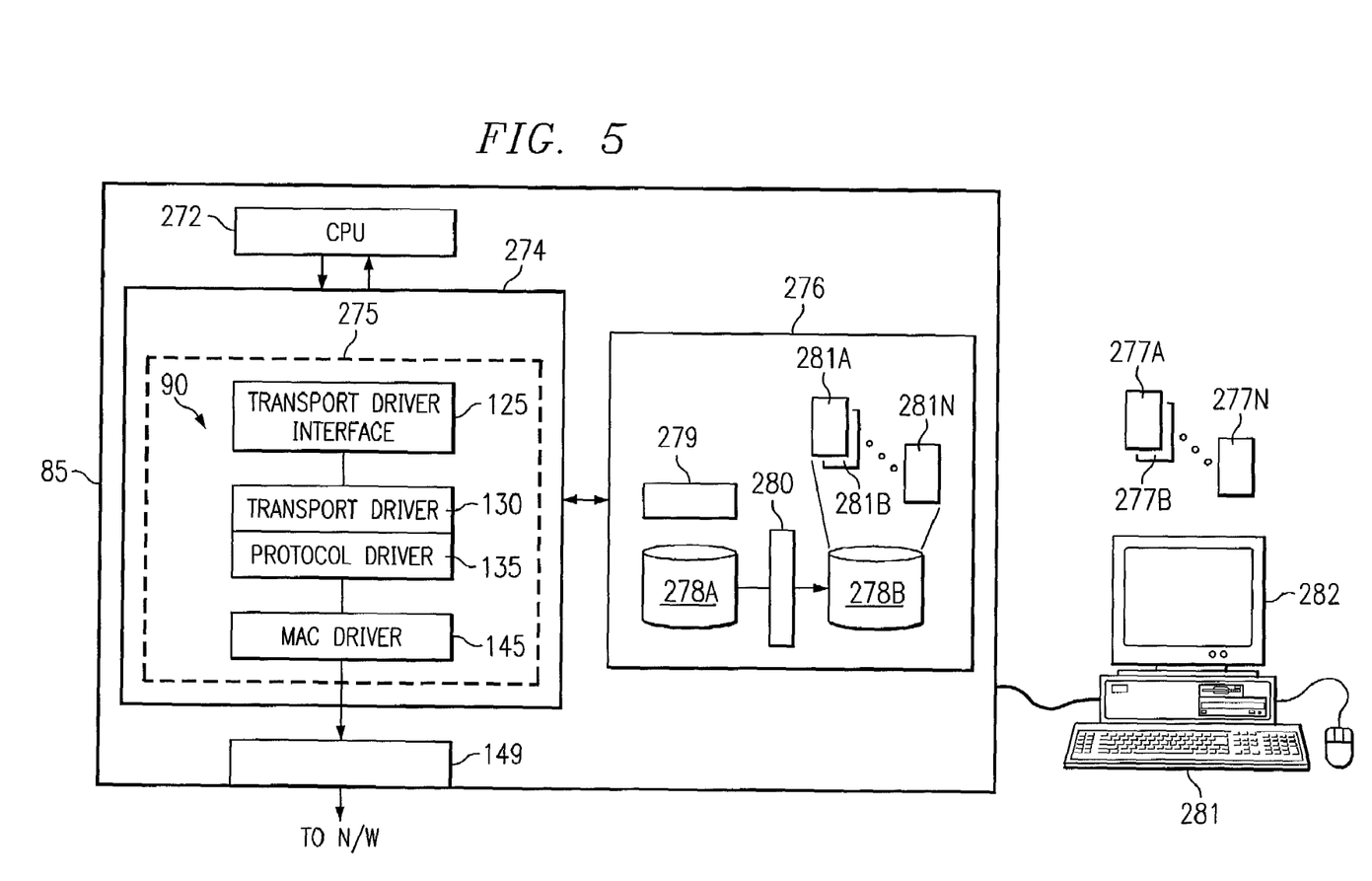
FIG. 5 illustrates an exemplary network node that may operate as a management node within a network protected by the intrusion protection system according to an embodiment of the present invention.

In FIG. 5, there is illustrated an exemplary network node that may operate as a management node 85 of the IPS of a network 100. Management node 85, in general, comprises a CPU 272 and a memory module 274 operable to store machine-readable code that is retrievable and executable by CPU 272 via a bus (not shown). A storage media 276, such as a magnetic disc, an optical disc or another component operable to store data, may be connected to memory module 274 and accessible thereby by the bus as well. An operating system 275 may be loaded into memory module 274, for example upon bootup of node 85, and comprises an instance of protocol stack 90. Operating system 275 is operable to fetch an IPS management application 279 from storage media 276 and load management application 279 into memory module 274 where it may be executed by CPU 272. Node 85 preferably has an input device 281, such as a keyboard, and an output device 282, such as a monitor, connected thereto.

An operator of management node 85 may input one or more text-files 277A–277N via input device 281. Each text-file 277A–277N may define a network-based exploit and comprise a logical description of an attack signature as well as IPS directives to execute upon an IPS evaluation of an intrusion-related event associated with the described attack signature. Each text file 277A–277N may be stored in a database 278A on storage media 276 and compiled by a compiler 280 into a respective machine-readable signature file 281A–281N that is stored in a database 278B. Each of the machine-readable signature files 281A–281N comprises binary logic representative of the attack signature as described in the respectively associated text-file 277A–277N. An operator of management node 85 may periodically direct management node 85, through interaction with a client application of IPS application 279 via input device 281, to transmit one or more machine-readable signature files (also generally referred to herein as "signature files") stored in database 278B to a node, or a plurality of nodes, in network 100. Alternatively, signature files 281A–281N may be stored on a computer-readable medium, such as a compact disk, magnetic floppy disk or another portable storage device, and installed on node 270 of network 100. Application 279 is preferably operable to transmit all such signature-files 281A–281N, or one or more subsets thereof, to a node, or a plurality of nodes, in network 100. Preferably, IPS application 279 provides a graphical user interface on output device 282 for facilitating input of commands thereto by an operator of node 85.

Figure 6:
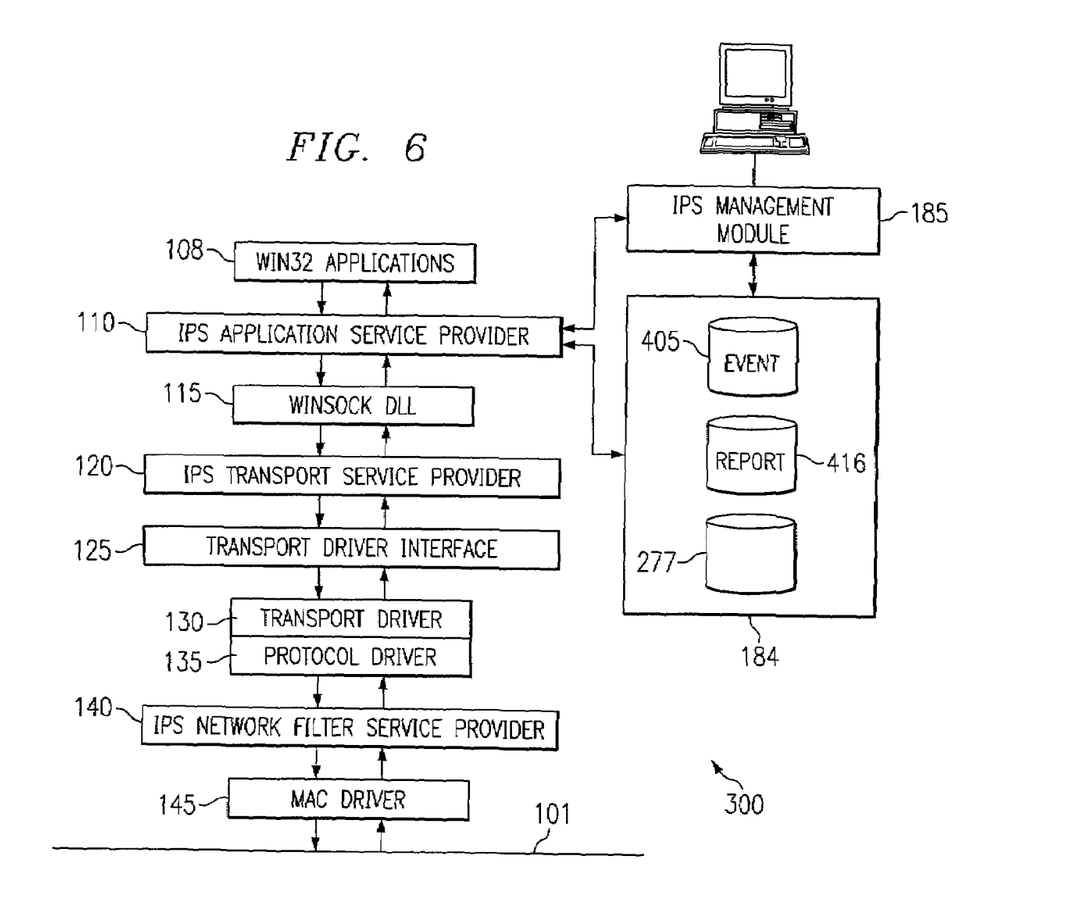
FIG. 6 illustrates a three-layered intrusion prevention system installed in an exemplary protocol stack according to an embodiment of the present invention.

In FIG. 6, there is illustrated a three-layered IPS 300 installed in an exemplary protocol stack according to an embodiment of the invention. IPS 300 may be installed in a network stack of each node of network 100 protected by IPS 300, as well as an IPS management node 85 and/or one or more network-based IPS appliances 80 and 81.

Attack threat analysis is performed at three separate layers. An IPS application service provider layer 110, also referred to as an IPS server, provides system integrity via baseline analysis of, for example, running programs, file systems, user profile management applications, monitoring of application logs to determine when an attack has occurred, network usage monitoring and other "log watching" measures and monitoring of application layer 108. IPS application service provider layer 110 facilitates operation of an IPS transport service provider layer 120 and a network filter service provider 140 installed at the network layer as an intermediate driver of the network stack. Service provider layer 110 generally is implemented as a host-based security system and may generate alerts to a management console upon detection of an application-level violation. IPS application service provider 110 also may interact with a local file system 184 that may comprise an event database 405 and/or a report database 416 for archiving intrusion-related events detected by IPS 300 and that may facilitate analysis of intrusion-events locally at a network node running IPS 300. IPS service provider layer 110 may provide detection of network exploits by monitoring or filtering application level data. For example, IPS service provider layer 110 may interface with an application filter, such as an Internet server application programming interface (ISAPI) plugin that performs URL filtering, for a Microsoft Internet information server. IPS management node 85 may interact with IPS 300, such as supplying event and report queries thereto, via an IPS client application running at management node 85 that may engage in a communication session with IPS server 110.

An IPS transport service provider layer 120 establishes a baseline of network ports, sockets, and network application usage. Transport service provider layer 120 is preferably above any network encryption layer, such as IPSec, LAN emulation or any tunneling protocols so that content scanning may be performed thereby on raw application data prior to the application data being encapsulated by protocol driver 135 for transmission across network 100. IPS transport service provider 120 may provide network exploit detection at the transport layer level. For example, IPS transport service provider 120 may comprise layered serviced provider filters to facilitate socket level filtering by including layered serviced provider filters within IPS transport service provider layer 120. IPS application 91 may filter frames at a node of network 100 after reassembly of the constituent network packets and unencryption thereof has been performed by including IPS transport service provider 120 within IPS application 91. Accordingly, IPS transport service provide layer 120 may detect attacks, such as multiframe attacks and fragmented attacks, that do not have signatures that are easily detectable over a single packet or series of packets, but that may be detected by filtering an exploitative frame comprised of assembled and unencrypted constituent packets.

A network filter service provider layer 140 is bound to a media access control (MAC) driver 145 and protocol driver 135 at the network layer of protocol stack 90 and thus may perform low-level filtering comprising filtering for atomic network attacks, network protocol level attacks, IP filtering, port filtering and gathering of network statistics on both inbound and outbound directions. Network filter service provider 140 provides real-time dynamic filtering of network exploit rules and signature matching of inbound and outbound data. Network filter service provider 140 may comprise an associative process engine as described in co-pending application entitled "Method, Node and Computer Readable Medium for Identifying Data in a Network Exploit" and filed concurrently herewith and dynamic filtering may be performed thereby such that IPS 300 may be dynamically updated without reinitialization of network stack 90. Network exploits may be identified at the network layer by network filter service provider 140, IPS transport service provider 120, and IPS service provider layer 110 of the described three-layered IPS application 91. Accordingly, inbound exploits directed at the node running IPS application 300 may be prevented from reaching upper layers of network stack 90 by discarding frames identified as suspicious or intrusion-related at the network layer and may prevent exploits originating from the node running IPS application 300, such as exploitative data generated from a Trojan application disposed at application layer 108, from being transmitted from the node running IPS 300 thus preventing the node running IPS 300 from being used as a zombie system in a network attack. Network exploits that circumvent network filter service provider 140, for example by bypassing signature analysis techniques employed thereby via multiframe or fragmented attacks or other means, may be detected by IPS transport service provider 120 that may perform transport level filtering. Application level attacks may be detected by IPS service provider layer 110. A text-based exploit signature description language may be used to generate a database 277 of machine-readable signature files that are fed to network filter service provider 140 by IPS server 110. Accordingly, database 277 may be updated with system service packs such that IPS 300 is dynamically updated without requiring reinitialization of network filter service provider 140 thus averting the need of system reboots each time IPS 300 is updated for, by example, installation of new signature files in database 277.

What is claimed is:

1. A node of a network, comprising:
   a central processing unit;
   a memory module for storing data in machine readable format for retrieval and execution by the central processing unit; and
   an operating system comprising a network stack comprising a protocol driver, a media access control driver, the memory module storing an instance of an intrusion protection system application operable to monitor application layer data and an intrusion prevention system transport service provider layer, and the operating system having an intrusion prevention system network filter service provider bound to the media access control driver and the protocol driver.

2. The node according to claim 1, further comprising a file system, the intrusion protection system application operable to communicate with the file system.

3. The node according to claim 2, wherein the file system comprises a database, the intrusion prevention system application operable to log intrusion-related data in the database, the intrusion-related data obtained by at least one of the intrusion prevention system application, the intrusion prevention system transport service provider and the intrusion prevention system network filter service provider.

\* \* \* \* \*

UNITED STATES PATENT AND TRADEMARK OFFICE
CERTIFICATE OF CORRECTION

PATENT NO. : 7,197,762 B2  
APPLICATION NO. : 10/003747  
DATED : March 27, 2007  
INVENTOR(S) : Richard Paul Tarquini Page 1 of 1

It is certified that error appears in the above-identified patent and that said Letters Patent is hereby corrected as shown below:

In column 1, lines 44-45, delete "10/002,0712," and insert -- 10/002,072, --, therefor.

In column 1, line 46, delete "INTEGRATED" before "INTRUSION".

In column 2, line 4, delete "INTEGRATED" and insert -- INTEGRATING --, therefor.

In column 7, line 33, insert -- 30 -- before "may suffer".

Signed and Sealed this

Twenty-third Day of September, 2008

JON W. DUDAS  
*Director of the United States Patent and Trademark Office*